United States Patent [19]

Schülde et al.

[11] 4,246,394

[45] Jan. 20, 1981

[54] PROCESS OF HARDENING EPOXY COATING COMPOSITION WITH DICYANDIAMIDE/IMIDAZOLINE DERIVATIVE

[75] Inventors: Felix Schülde, Wulfen; Johann Obendorf, Dorsten, both of Fed. Rep. of Germany

[73] Assignee: Veba-Chemie Aktiengesellschaft, Herne, Fed. Rep. of Germany

[21] Appl. No.: 902,466

[22] Filed: May 3, 1978

Related U.S. Application Data

[63] Continuation of Ser. No. 723,843, Sep. 16, 1976, abandoned.

[30] Foreign Application Priority Data

Sep. 20, 1975 [DE] Fed. Rep. of Germany ....... 2542105

[51] Int. Cl.³ .............................................. C08G 59/56
[52] U.S. Cl. .................................... 528/117; 428/413; 528/94; 528/120; 528/361; 528/407; 528/413
[58] Field of Search ................. 528/94, 117, 120, 361, 528/407; 428/413

[56] References Cited

U.S. PATENT DOCUMENTS

| | | | |
|---|---|---|---|
| 3,549,592 | 12/1970 | Godfrey et al. .................. | 260/47 |
| 3,631,150 | 12/1971 | Green ............................... | 260/47 EN |
| 3,655,617 | 4/1972 | Imoehl et al. ................... | 260/47 EN |
| 3,842,035 | 10/1974 | Klaren ............................. | 260/47 EN |
| 3,896,082 | 7/1975 | Rensmann et al. ............. | 260/47 EN |
| 3,903,048 | 9/1975 | Lombardi et al. .............. | 260/47 EN |

*Primary Examiner*—Harold D. Anderson

*Attorney, Agent, or Firm*—Sprung, Felfe, Horn, Lynch & Kramer

[57] ABSTRACT

An improvement for producing a coating from a powder lacquers composition comprising at least one 1,2-epoxide compound having at least one 1,2-epoxide group in the molecule which compound has a lower melting point greater than 40° C., and dicyandiamide wherein the powder coating lacquer composition additionally contains an imidazoline derivative of the general structure

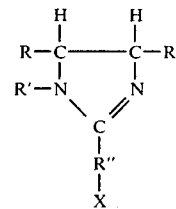

wherein R is hydrogen, an alkyl or aryl residue, R' is a cycloalkyl, heterocyclo alkyl or R, R" is an alkyl or aryl substituted or unsubstituted alkylene or arylene, X is hydrogen or a radical having the following structure

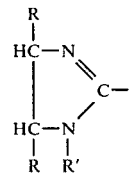

9 Claims, No Drawings

PROCESS OF HARDENING EPOXY COATING COMPOSITION WITH DICYANDIAMIDE/IMIDAZOLINE DERIVATIVE

This is a continuation of application Ser. No. 723,843, filed Sept. 16, 1976, now abandoned.

BACKGROUND OF THE INVENTION

1. Field of the Invention

This invention relates to powder coating compositions especially powder lacquer coating compositions. More particularly, this invention relates to a powder lacquer composition containing at least one 1,2-epoxide compound having at least one 1,2-epoxide group in the molecule which compound has a lower melting point greater than 40° C. which is hardened by a mixture comprising dicyandiamide and an imidazoline derivative. This invention is also concerned with a process of preparing a coating on a substrate wherein a powder coating composition comprising a 1,2-epoxide compound having at least one 1,2-epoxide group in the molecule and having a lower melting point greater than 40° C. is employed together with a hardener composition comprising a mixture of dicyandiamide and an imidazoline derivative.

2. Discussion of the Prior Art

Powder lacquers are finding use to an increasing degree for the manufacture of coatings. Powder lacquers are finely powdered, synthetic compounds, consisting of a resin that is cross-linkable by heating, e.g. epoxide resins, one or more cross-linking agent, i.e. hardener, and additives, such as pigments, dyes, fillers, flow aids and more.

The use of dicyandiamide, as hardener for epoxide-resin powder lacquers, is also known. The use of this conventional hardener leads to the following disadvantage however:

Dicyandiamide has only slight reactivity. Epoxide-resin powder lacquers, that use dicyandiamide as hardener, require longer setting times even at higher setting temperatures (200° C.).

It is furthermore known that cyclic amidines possess a high reactivity in epoxide-resin powder lacquer systems.

SUMMARY OF THE INVENTION

In view of the above, it is an object of the present invention to accelerate the reaction with dicyandiamide to such an extent that this hardener would be suitable as a cross linking agent for normally hardenable epoxide-resin powder lacquers and will yield coatings with good industrial lacquer properties.

It is another object of the present invention to provide an accelerator composition for such a 1,2-epoxide compound. It is especially an object of this invention to provide an accelerator wherein the action of the dicyandiamide is accelerated by the use of another component.

Broadly, this invention contemplates an improvement in a process for producing a coating from a powder lacquer composition wherein the lacquer composition which is hardenable and contains at least one 1,2-epoxide compound having at least one 1,2-epoxide group in the molecule which compound has a lower melting point greater than 40° C., is applied to the substrate together with a hardener, the improvement residing in employing as a hardener composition a composition comprising dicyandiamide and an imidazoline derivative of the general structure

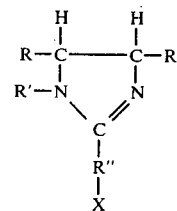

wherein R is hydrogen, an alkyl or aryl residue, R' is cycloalkyl, heterocycloalkyl or R residue, R" is an alkyl or aryl substituted or unsubstituted alkylene or arylene residue and X is hydrogen or a

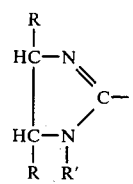

residue,

In accordance with the present invention by including in the powder lacquer composition containing the 1,2-epoxide compound and dicyandiamide, the imidazoline derivative superior hardening is effected without the presence of any deleterious properties. Generally speaking, the hardener composition comprising the dicyandiamide and imidazoline derivative contains the imidazoline derivative in an amount of between 10 and 90% by weight.

By using these mixtures of dicyandiamide and the imidazoline derivatives as hardeners or cross-linkers for powder-lacquer systems based on 1,2-epoxide compounds, coatings are obtained which, from a technological and optical point of view, are significantly superior to those powder lacquers formulated with conventional hardeners.

Apart from the high degree of gloss and the absence of pores in the lacquer films, physical tests show high values for powder-covered coatings.

The great resistance towards loads such as impact, bending and scratching, as well as the excellent resistance towards washing solutions and hot water, must be emphasized especially.

Furthermore, when using the inventive hardener mixtures at the same setting temperatures, it was determined that setting times are required that correspond to the proportions of the components and that lie between the short setting times of the imidazoline derivatives and the long setting times of the dicyandiamide.

Accordingly, for a hardener mixture of dicyandiamide and 2-phenyl-imidazoline, optimum properties of the coating were achieved at the following stoving conditions.

| Weight % 2-Phenyl-imidazolin | Weight % Dicyan-diamid | Hardening time at 160° C. | 180° C. | (in min) 200° C. |
|---|---|---|---|---|
| 100 | — | 8 | 4 | 3 |
| 70 | 30 | 40 | 9 | 8 |
| 60 | 40 | 30 | 11 | 8 |
| 30 | 70 | 37 | 14 | 10 |

| Weight % 2-Phenyl-imidazolin | Weight % Dicyan-diamid | Hardening time at (in min) | | |
|---|---|---|---|---|
| | | 160° C. | 180° C. | 200° C. |
| 20 | 80 | 45 | 18 | 10 |
| — | 100 | 50 | 21 | 14 |

Yellowing phenomena in the lacquer films are avoided thereby that, on the one hand, the difference between the stoving temperature and the yellowing temperature is much greater than when using only pure dicyandiamide, and, on the other, the stoving times are also shorter.

Referring to the general formula above for the imidazoline derivatives, each R moiety can be independently hydrogen, alkyl or aryl. When R is alkyl, it is preferably an alkyl group of 1 to 8 carbon atoms, especially 1 to 4 carbon atoms as typified by methyl, ethyl, propyl, n-butyl, isobutyl. When R is an aryl group, it is preferably an aryl group having up to 18 carbon atoms in the ring as typified by phenyl, naphthyl, anthracyl and biphenyl. R can also be hydrogen. Similarly, where R' is a cycloalkyl group, it preferably contains between 3 and 8 carbon atoms in the ring. Where R' is a heterocycloalkyl group, it contains between 3 and 8 carbon atoms in the ring, the hetero atom being oxygen, sulfur, nitrogen or phosphorous. Where R' is the same as an R radical, it is preferably hydrogen, an alkyl radical of 1 to 8 carbon atoms or an aryl radical of 6 to 18 carbon atoms in the aryl ring.

Where R" is present, it is preferably an alkylene ring having from 1 to 8 carbon atoms in the chain, preferably 1 to 4 carbon atoms. Were alkyl substituted, the alkyl group is preferably 1 to 8 carbon atoms, more preferably 1 to 4 carbon atoms. Where R" is aryl substituted, the aryl substituent is preferably phenyl, naphthyl or biphenyl. Where R" is an arylene group, it preferably contains 6 to 18 carbocyclic carbon atoms in the aryl nuclei.

Suitable imidazoline derivatives in the sense of the present invention, that correspond to the previously described general structure, are for example those with, if necessary; alkyl substituted aryl residues, heterocyclic and those which contain a second imidazoline group linked via an alkylene or arylene bridge such as 2-methyl-imidazoline, 2,4-dimethyl-imidazoline, 2-chloromethyl-imidazoline, 2-ethyl-imidazoline, 2-ethyl-4-methyl-imidazoline, 1-vinyl-2-methyl-imidazoline, 2-benzyl-imidazoline, 2-(1-naphthylmethyl)-imidazoline, 2-phenyl-4-methyl-imidazoline, 2-(o-tolyl)-imidazoline, 2-(m-tolyl)-imidazoline, 2-(m-tolyl)-4-methyl-imidazoline, 2-(p-tolyl)-imidazoline, 2-(m-pyridyl)-imidazoline, 2-(p-pyridyl)-imidazoline, tetramethylene-bis-imidazoline, 1,4-tetramethylene-bis-(4-methyl-imidazoline-2), 1,1,3-trimethyl-1,4-tetramethylene-bis-imidazoline, 1,3,3-trimethyl-1,4-tetramethylene-bis-4-methylimidazoline, 1,2-, 1-3- and 1,4-phenylene-bis-imidazoline, 1,4-phenyl-bis-4-methylimidazoline and still other ones. Obviously, mixtures of those imidazolines can also be used.

The mixtures of dicyandiamide and imidazoline derivatives, that can be used in accordance with the invention, are produced by homogeneously mixing the two components, as stated, in the weight ratio of 90:10 to 10:90.

The above described hardener or cross linker mixtures are used in amounts of 3.5 to 18 parts by weight, preferably 5 to 9 parts by weight, based on 100 parts by weight of epoxide resin. The preferred range applies particularly to resins with an epoxide equivalent weight of 900 to 1000, which corresponds approximately to an epoxide value of 0.10 to 0.11.

For the manufacture of finely partitculate mixtures, that are to find use as powder lacquers, 1,2-epoxide compounds are suitable that contain at least one 1,2-epoxide group in the molecule and have a lower melting point that is greater than 40° C. Compounds that correspond to these characteristics, are on the one hand polyepoxide compounds, that are solid at 40° C. and below, and include higher molecular weight compounds (so-called solid resins) and those that are solids because of their symmetrical construction or the size of the carbon system linked to the 1,2-epoxide group and, those that are produced by reacting liquid 1,2-epoxide compounds with more than one epoxide group per molecule with primary or secondary amines in such an amount that the adduct still contains on the average at least one 1,2-epoxide group per molecule (adduct hardener).

The 1,2-epoxide compounds may be saturated or unsaturated, aliphatic, cycloaliphatic, aromatic and heterocyclic. They may furthermore contain such substituents, that cause no interfering side reactions under the conditions of mixing or reaction. Alkyl or ayrl substituents, hydroxy groups ether groups or the like produce no side reactions.

The preferred solid resins for this application purpose are 1,2-epoxide compounds with more than one epoxide group in the molecule, whose epoxide equivalent weight lies between 500 and 1000. Such compounds are the solid, polymeric polyglycidyl polyethers of 2,2-bis-(4-hydroxyphenyl)-propane, that may be obtained, for example, by reacting 2,2-bis-(4-hydroxyphenyl)-propane with epichlorhydrin in the molar proportion of 1:1.9 to 1.2 (in the presence of an alkali hydroxide in aqueous medium). Polymeric polyepoxides of this type can also be obtained by reacting a polyglycidyl ether of 2,2-bis-(4-hydroxyphenyl)-propane with less than the equimolecular amount of a bivalent phenol, preferably in the presence of a catalyst, such as a tertiary amine, a tertiary phosphine or a quaternary phosphonium salt. The polyepoxide may also be a solid epoxidized polyester, that was obtained, for example, by reaction of a multivalent alcohol and/or a multibasic carboxylic acid or its anhydride, with a low molecular weight polyepoxide. Examples of such polyepoxides with low molecular weight are liquid diglycidyl ethers of 2,2-bis-(4-hydroxyphenyl)-propane, diglycidyl phthalate, diglycidyl adipate, diglycidyl tetrahydrophthalate, diglycidyl hexahydrophthalate, diglycidyl maleate and 3,4-epoxycyclohexyl methyl ester of 3,4-epoxycyclohexane carboxylic acid.

Mixtures of solid polyepoxides can also be used, e.g. a mixture of a polyepoxide whose melting point lies between 120° and 160° C. and a polyepoxide with a melting point between 60° and 80° C. (melting points are determined according to the mercury method of Burrans). Suitable mixtures contain between 30 and 50% by weight of a solid polyglycidyl ether of 2,2-bis-(4-hydroxyphenyl)-propane with an epoxy equivalent weight between 1,650 and 2,050 and a melting point of 120° to 160° C., and between 50 and 70% by weight of a solid polyglycidyl polyether of 2,2-bis(4-hydroxyphenyl)-propane with an epoxy equivalent weight between 450 and 525 and a melting point of 60° to 80° C.

The polyglycidyl ether of 1,1,2,2-tetra-(hydroxyphenyl)-ethane is a preferred polyepoxide, if a high epoxy functionality is desirable.

As was already mentioned earlier, in addition to the so-called solid resins, adduct hardeners are also suitable for carrying out the inventive process. Such solid adduct hardeners can, for example, be prepared from liquid polyepoxides of hydrocarbons with many unsaturated groups, such as vinylcyclohexene, dicyclopentadiene and the like, epoxy ethers of multivalent alcohols and phenols, etc., and aliphatic, cycloaliphatic and aromatic diamines.

The prerequisite for the suitability of such an adduct is the criterion that the lower melting point must be above 40° C.

So-called flow aids are added during the preparation of lacquers, to improve their flow properties. These materials may be chemical compounds or mixtures of very different chemical type, e.g. polymeric or monomeric compounds, acetals such as polyvinyl formal, polyvinyl acetal, polyvinyl butyral, polyvinyl acetobutyral or di-2-ethylhexyl-i-butyraldehyde-acetal, di-2-ethylhexyl-n-butyraldehyde-acetal, diethyl-2-ethylhexanol-acetal, di-n-butyl-2-ethylhexanol-acetal, di-i-butyl-2-ethylhexanol-acetal, di-2-ethyl-hexyl-acetaldehyde-acetal and the like, ethers such as the polymeric polyethylene and polypropylene glycols, copolymers of n-butyl acrylate and vinyl isobutyl ether, ketone-aldehyde condensation resins, solid silicone resins and also mixtures of zinc soaps, of fatty acids and aromatic carboxylic acids and the like. For this purpose, commercial products such as Modaflow ® are also offered, whose chemical character is not known to the user other than that it is a complex, polymeric, effective liquid. Such flow aids may be contained in the batches of powder resin in amounts of 0.2–5.0% by weight based on the total amount of powder lacquer.

The amounts of other constituents of the powder lacquer mixture, such as pigments, dyes, fillers and others, may vary within wide ranges.

Before they are used, the components of the powder lacquer are first of all intimately mixed, extruded at certain temperatures and subsequently cooled and ground. In practical applications, a particle size of less than 100μ is preferably aimed for, whereby the maximum particle size should preferably lie between 30 and 50μ.

The powder lacquer is applied to the object to be coated by known methods, e.g. electrostatic powder spraying, turbulent sintering, electrostatic sintering, etc.

When the powder lacquers have been applied to the objects to be lacquered, they are set by being heated to temperatures of 130°–210° C., preferably to 140°–180° C. The resulting coatings then have the described advantages.

In order to more fully illustrate the nature of the invention and the manner of practicing the same, the following examples are presented:

GENERAL DESCRIPTION OF THE METHODOLOGY USED

The 1,2-epoxide compounds with the special characteristics, that were used for carrying out the following experiments, are called epoxide resins in practice. They were mixed with mixtures of dicyandiamide and imidazoline derivatives acting as both cross-linkers and hardeners, pigments and additives such as flow aids, in the proportions by weight stated, extruded (temperature of mass 80°–90° C., temperature of the extruded mass 100°–110° C.) and finally cooled and ground. The particle size of the powder lacquer constituents was less than 100μ. The frequency distribution of the particle size had a maximum in the region of 30–50μ. These finely particulate mixtures were then applied by electrostatic powder spraying onto test sheets of steel and subsequently set at the temperatures and times given. The mechanical and commercial lacquer properties of the lacquer films obtained were determined by the tests below.

EXAMPLE 1

2-phenyl-imidazoline was processed to a powder lacquer or sinter powder with titanium dioxide and an epoxide resin as well as a slight addition of a flow aid, these materials being added in the proportions given below:

Composition of the powder lacquer

Solid epoxide resin, based on an adduct of 2,2-bis-(4-hydroxyphenyl)-propane (Diane) and epichlorhydrin, which was subjected to an HCl cleavage and subsequently reacted with further amounts of Diane and which, according to the date of the manufacturer had an epoxide equivalent weight in the range of 900–1000, which corresponds to an epoxide value of 0.10–0.11. It had a melting point range of 90°–100° C.: 56.0% by weight

| | | |
|---|---|---|
| 2-phenyl-imidazoline | 3.5% | by weight |
| TiO₂ (in powder form) | 40.0% | by weight |
| flow aid which can be obtained commercially under the name of "Modaflow ®" | 0.5 | by weight |
| The following values were measured on the powder: | | |
| gel time* at 200° C. | 65 sec | |
| Reactivity** | | |
| Run down distance at 150° C. | 5.6 cm | |
| at 170° C. | 6.3 cm | |

*The gel time was determined as follows. A spatula tip full of the powder of the formulation described was placed on a plate, which had been preheated to a certain temperature (200° C.). The spatula was now moved up and down, until the thread that had formed after some time, tore off. The time that elapsed between the melting of the powder and the tearing off of the thread, was called the gel time in this application.

**In order to determine the reactivity, 9.4 g. epoxide resin and 0.6 g hardener were mixed. 0.5 g of this mixture were pressed into a tablet. This tablet was placed on a metal sheet, which was placed at an angle of 45° for 10 minutes in an oven at a certain temperature. After this time, the distance that the molten tablet had run down, was measured.

This formulation was applied to a test sample, hardened for 5 minutes at 200° C. and then tested to give the following results:

| | |
|---|---|
| Thickness of layer | 90–100 μ |
| Degree of gloss (acc. to Gardner 60°) | 100% |
| Erichsen cupping (DIN 53 156) | 9.7 mm |
| Grid ruling (DIN 53 151) | 0 |
| Mandrel transverse bending test (DIN 53 152) | 2 mm average |
| Ball impact (acc. to Gardner) (reverse impact) | 80 in lb |

EXAMPLE 2

A mixture of 70% by weight 2-phenyl-imidazoline and 30% by weight of dicyandiamide were formulated with the epoxide resin of Example 1:

| | |
|---|---|
| Composition of the powder lacquer | |
| Epoxide resin | 56.0% by weight |

-continued

| Composition of the powder lacquer | |
|---|---|
| Mixture of 2-phenylimidazoline and dicyandiamide 70:30 | 3.5% by weight |
| TiO$_2$ (in powder form) | 40.0% by weight |
| Flow aid (as in Example 1) | 0.5% by weight |

The following values were measured on the powder:

| Gel time (at 200° C.) | 41 sec |
|---|---|
| Reactivity (run-down distance) | |
| at 150° C. | 5.0 cm |
| at 170° C. | 5.5 cm |

The following results were obtained after the material had been cured for 10 minutes at 180° C.:

| Thickness of layer | 80–90 μ |
|---|---|
| Degree of gloss (acc. to Gardner 60°) | 95–100% |
| Erichsen cupping (DIN 53 156) | 10 mm |
| Grid ruling (DIN 53 151) | 0 |
| Mandrel transverse-bending test (DIN 53 152) | 2 mm average |
| Ball impact (acc. to Gardner) (reverse impact) | 80 in lb |

EXAMPLE 3

A mixture of 60% by weight of 2-phenyl-imidazoline and 40% by weight dicyandiamide were formulated with the epoxide resin of Example 1:

Composition of the powder lacquer:

| Epoxide resin | 56.0% by weight |
|---|---|
| Mixture of 2-phenyl-imidazoline and dicyandiamide 60:40 | 3.5% by weight |
| TiO$_2$ in powder form | 40.0% by weight |
| Flow aid (as in Example 1) | 0.5% by weight |

The following values were measured on the powder:

| Gel time (at 200° C.) | 46 sec |
|---|---|
| Reactivity (run-down distance) | |
| at 150° C. | 5.0 cm |
| at 170° C. | 6.0 cm |

The following results were obtained after the material had been cured for 10 minutes at 180° C.:

| Thickness of layer | 80–90 μ |
|---|---|
| Degree of gloss (acc. to Gardner 60°) | 95–100% |
| Erichsen cupping (DIN 53 156) | 10 mm |
| Grid ruling (DIN 53 151) | 0 |
| Mandrel transverse-bending test (DIN 53 152) | 2 mm average |
| Ball impact (acc. to Gardner) (reverse impact) | 80 in lb |

EXAMPLE 4

A mixture of 30% by weight 2-phenyl-imidazoline and 70% by weight dicyandiamide were formulated with the epoxide resin of Example 1:

Composition of the powder lacquer

| Epoxide resin | 56.0% by weight |
|---|---|
| Mixture of 2-phenyl-imidazoline and dicyandiamide 30:70 | 3.5% by weight |
| TiO$_2$ in powder form | 40.0% by weight |
| Flow aid (as in Example 1) | 0.5% by weight |

The following values were measured on the powder:

| Gel time (at 200° C.) | 88 sec |
|---|---|
| Reactivity (run-down distance) | |
| at 150° C. | 6.9 cm |
| at 170° C. | 7.9 cm |

The following results were obtained after the material had been cured for 10 minutes at 180° C.:

| Thickness of layer | 70–80 μ |
|---|---|
| Degree of gloss (acc. to Gardner 60° C.) | 100% |
| Erichsen cupping (DIN 53 156) | 9.3 mm |
| Grid ruling (DIN 53 151) | 0 |
| Mandrel transverse-bending test (DIN 53 152) | 2 mm average |
| Ball impact (acc. to Gardner) (reverse impact) | 80 in lb |

EXAMPLE 5

A mixture of 20% by weight 2-phenyl-imidazoline and 80% by weight dicyandiamide were formulated with the epoxide resin of Example 1:

Composition of the powder lacquer:

| Epoxide resin | 56.0% by weight |
|---|---|
| Mixture of 2-phenyl-imidazoline and dicyandiamide 20:80 | 3.5% by weight |
| TiO$_2$ in powder form | 40.0% by weight |
| Flow aid (as in Example 1) | 0.5% by weight |

The following values were measured on the powder:

| Gel time (at 200° C.) | 150 sec |
|---|---|
| Reactivity (run down distance) | |
| at 150° C. | 8.2 cm |
| at 170° C. | 9.6 cm |

The following results were obtained after the material had been cured for 10 minutes at 180° C.:

| Thickness of layer | 70–8–μ |
|---|---|
| Degree of gloss (acc. to Gardner 60°) | 100% |
| Erichsen cupping (DIN 53 156) | 9.3 mm |
| Grid ruling (Din 52 151) | 0 |
| Mandrel tranverse-bending test (DIN 53 152) | 2 mm average |
| Ball impact (acc. to Gardner) (reverse impact) | 80 in lb |

EXAMPLE 6

Instead of 2-phenyl-imidazoline, the hardener used in examples 1-5, 1,4-tetramethylene-bis-imidazoline was mixed with dicyandiamide in the ratios of 100:0 to 0:100%, in steps of 10% by weight. The following reactivities (run-down distances) were determined on the individual mixtures with the epoxide resins of Example 1:

| Weight % 1,4-Tetramethyl-ene-bis-imidazoline | Weight % Dicyan-diamide | Reactivity (in cm of run down) | |
| --- | --- | --- | --- |
| | | 150° C. | 170° C. |
| 100 | 0 | 3.2 | 4.1 |
| 90 | 10 | 2.8 | 3.6 |
| 80 | 20 | 2.6 | 3.4 |
| 70 | 30 | 3.1 | 4.1 |
| 60 | 40 | 3.3 | 3.6 |
| 50 | 50 | 3.1 | 3.3 |
| 40 | 60 | 4.1 | 4.4 |
| 30 | 70 | 3.9 | 4.2 |
| 20 | 80 | 4.7 | 5.5 |
| 10 | 90 | 8.0 | 9.4 |
| 0 | 100 | 9.0 | 11.6 |

EXAMPLE 7

Instead of 2-phenyl-imidazoline, used as hardener in Examples 1-5, 2-phenyl-4-methyl-imidazoline was mixed with dicyandiamide in proportions of 100:0 to 100% by weight in steps of 10% by weight. The following reactivities (run-down distances) were determined for the individual mixtures with the epoxide resin of Example 1.

| Weight % 2-Phenyl-4-methyl-imidazoline | Weight % Dicyan-diamide | Reactivity (in cm of run down) | |
| --- | --- | --- | --- |
| | | 150° C. | 170° C. |
| 100 | 0 | 6.2 | 7.4 |
| 90 | 10 | 5.8 | 6.7 |
| 80 | 20 | 6.1 | 7.0 |
| 70 | 30 | 6.0 | 7.5 |
| 60 | 40 | 6.7 | 7.4 |
| 50 | 50 | 7.1 | 7.5 |
| 40 | 60 | 7.3 | 7.8 |
| 30 | 70 | 7.4 | 8.2 |
| 20 | 80 | 9.3 | 10.4 |
| 10 | 90 | 9.4 | 11.5 |
| 0 | 100 | 8.9 | 11.7 |

What is claimed is:

1. In a process for producing a coating of a powder lacquer composition wherein a powder lacquer composition is applied to a substrate, the powder lacquer composition comprising a finely particulate mixture of a 1,2-epoxide compound, which epoxide compound contains at least one 1,2-epoxide group in the molecule and has a lower melting point greater than 40° C., and dicyandiamide the improvement which comprises including in the composition at least one imidazoline derivative of the general structure

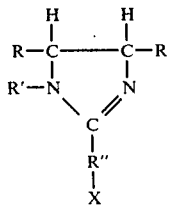

wherein R is hydrogen, an alkyl or aryl, R' is a cycloalkyl, heterocyclo alkyl or R, R" is an alkyl or aryl substituted or unsubstituted alkylene or arylene, X is hydrogen or a radical having the following structure

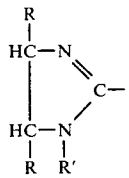

the dicyandiamide being present in excess relative to said imidazoline.

2. A process according to claim 1 wherein the imidazoline derivative is selected from the group consisting of 2-methyl-imidazoline, 2,4-dimethyl-imidazoline, 2-chloromethyl-imidazoline, 2-ethyl-imidazoline, 2-ethyl-4-methyl-imidazoline, 1-vinyl-2-methyl-imidazoline, 2-benzyl-imidazoline, 2-(1-naphthyl-methyl)-imidazoline, 2-phenyl-4-methyl-imidazoline, 2-(o-tolyl)-imidazoline, 2-(m-tolyl)-imidazoline, 2-(m-tolyl)-4-methyl-imidazoline, 2-(p-tolyl)-imidazoline, 2-(m-pyridyl)-imidazoline, 2-(p-pyridyl)-imidazoline, tetramethylene-bis-imidazoline, 1,4-tetramethylene-bis-(4-methyl-imidazoline-2), 1,1,3-trimethyl-1,4-tetramethylene-bis-imidazoline, 1,3,3-trimethyl-1,4-tetramethylene-bis-4-methylimidazoline, 1,2-phenylene-bis-imidazoline, 1,3-phenylene-bis-imidazoline, 1,4-phenylene-bis-imidazoline, and 1,4-phenyl-bis-4-methylimidazoline.

3. A process according to claim 1 wherein the mixture of dicyandiamide and imidazoline derivative is employed in an amount of 3.5 to 18 parts by weight per 100 parts by weight of epoxide compound.

4. A process according to claim 1 wherein the mixture of dicyandiamide and imidazoline is employed in a combined amount of 5 to 9 parts by weight per 100 parts by weight of epoxide resin.

5. A process according to claim 1 wherein the 1,2-epoxide compound is a saturated or unsaturated aliphatic, cycloaliphatic, aromatic or heterocyclic, 1,2-epoxide compound.

6. A process according to claim 1 wherein the epoxide compound is a solid polymeric polyglycidyl polyether of 2,2-bis-(4-hydroxyphenyl)-propane.

7. A process according to claim 1 wherein the 1,2-epoxide compound has an epoxide equivalent weight lying between 500 and 1000.

8. A process according to claim 1 wherein the epoxide compound is a solid epoxidized polyester of a low molecular weight polyepoxide selected from the group consisting of diglycidyl ethers of 2,2-bis-(4-hydroxyphenyl)-propane, diglycidyl phthalate, diglycidyl adipate, diglycidyl tetrahydrophthalate, diglycidyl hexahydrophthalate, diglycidyl maleate and 3,4-epoxycyclohexyl methyl ester of 3,4-epoxy-cyclohexane carboxylic acid.

9. A process according to claim 1 wherein the epoxy compound is the polyglycidyl ether of 1,1,2,2-tetra-(hydroxyphenyl)-ethane.

* * * * *